UNITED STATES PATENT OFFICE.

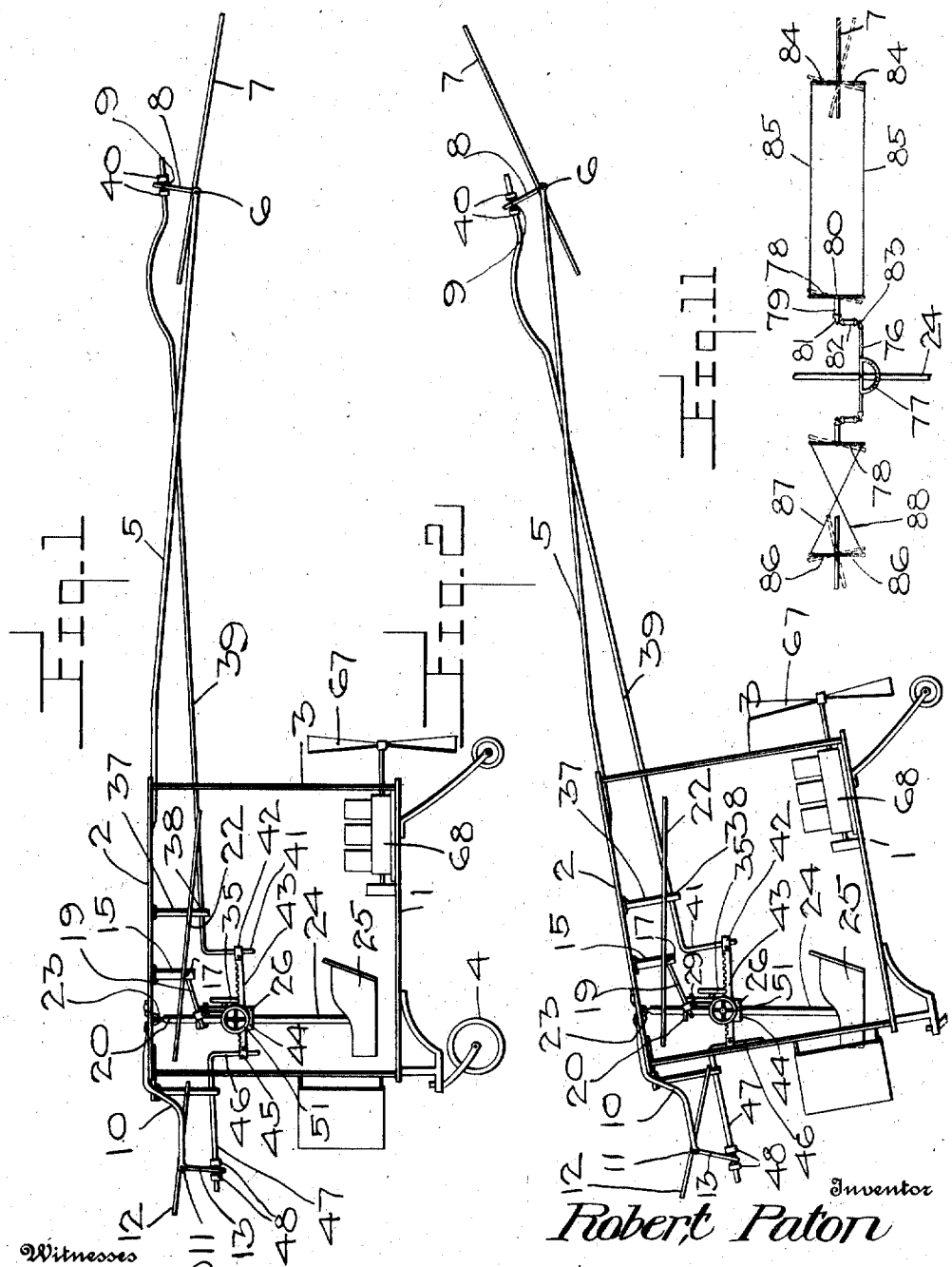

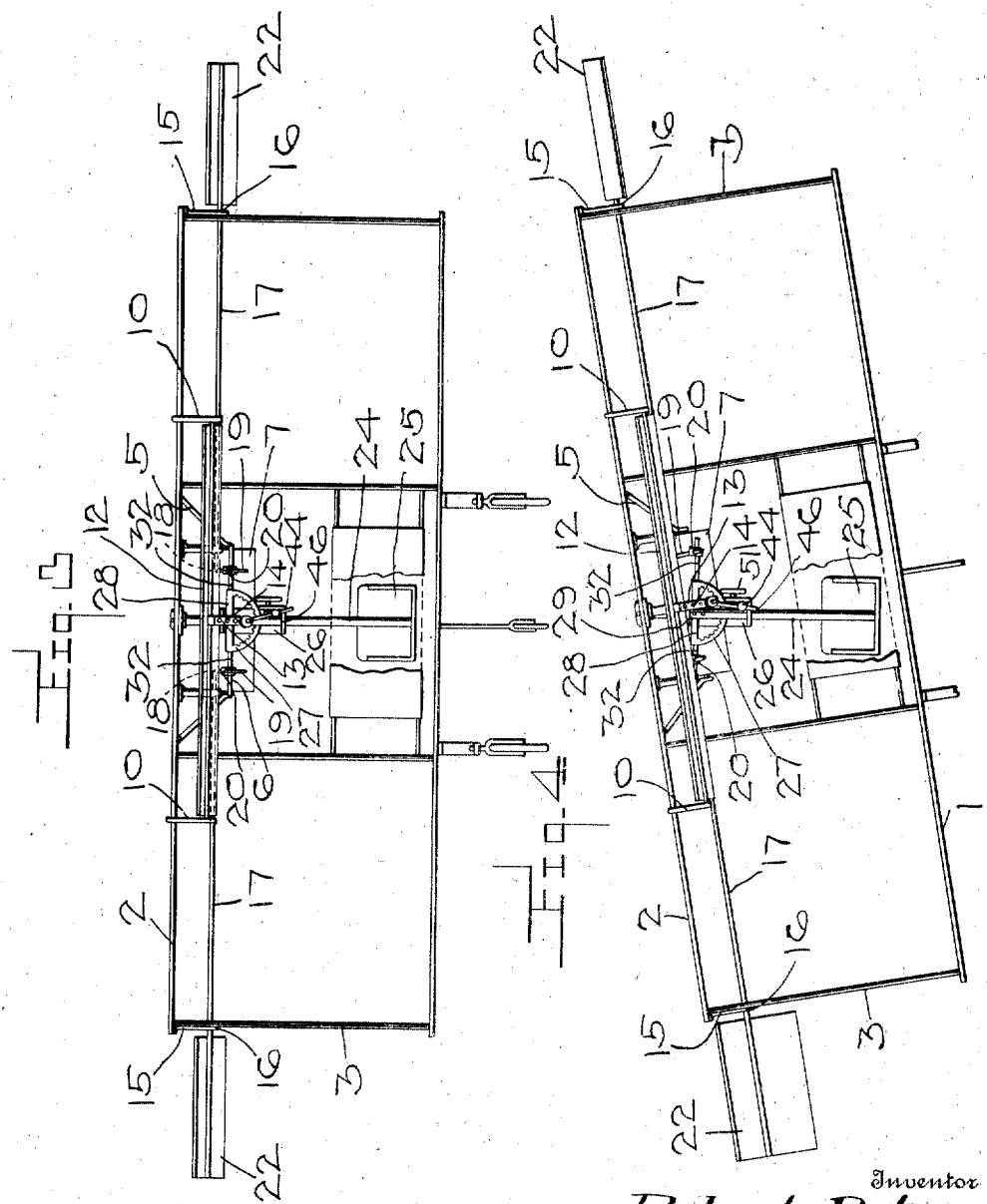

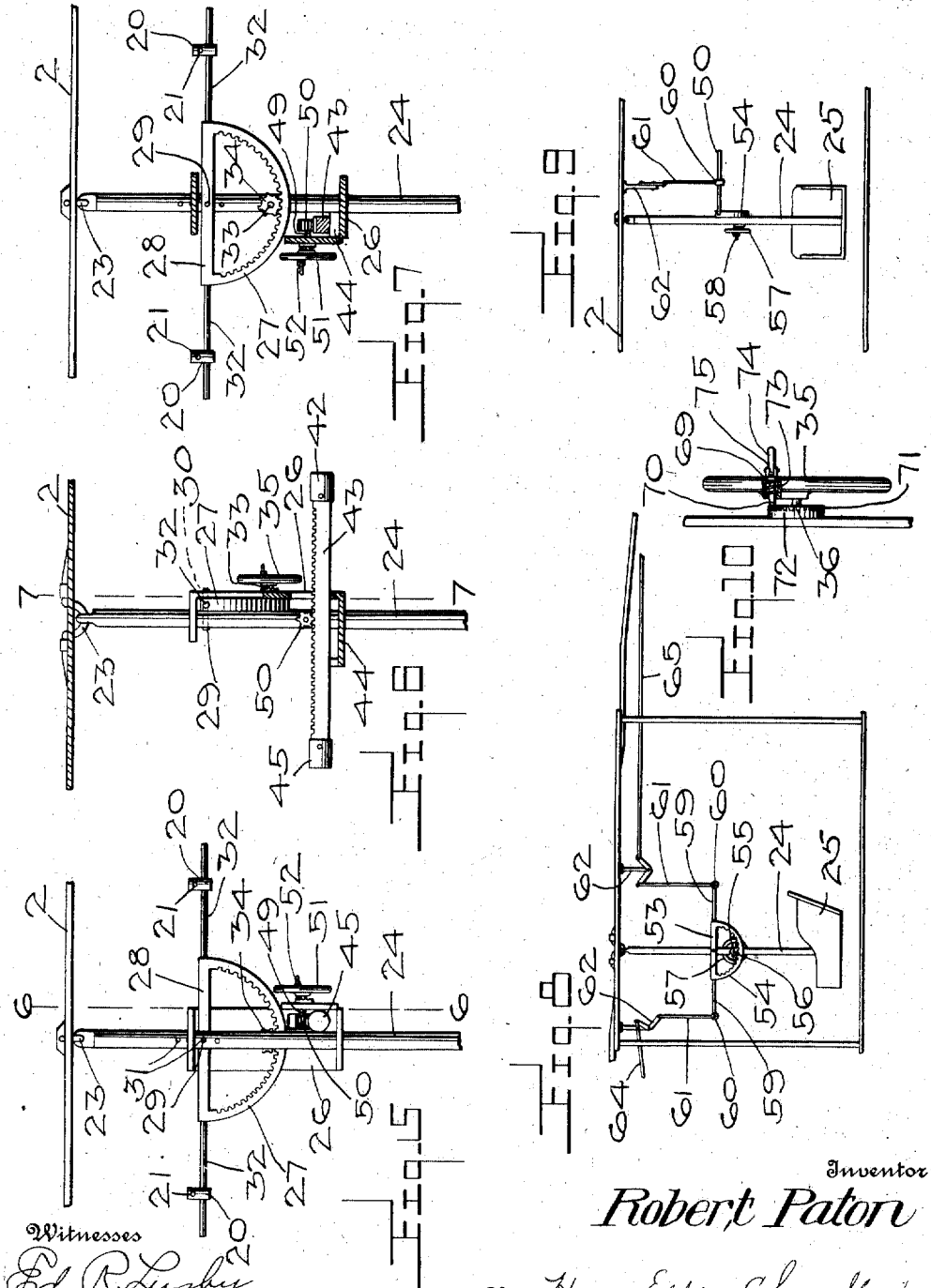

ROBERT PATON, OF CARRINGTON, NORTH DAKOTA, ASSIGNOR OF ONE-THIRD TO LUCAS K. SIVERTSON AND ONE-THIRD TO THOMAS N. PUTNAM, BOTH OF CARRINGTON, NORTH DAKOTA.

AEROPLANE.

994,782.  Specification of Letters Patent.  Patented June 13, 1911.

Application filed December 14, 1910. Serial No. 597,282.

*To all whom it may concern:*

Be it known that I, ROBERT PATON, a citizen of the United States, residing at Carrington, in the county of Foster and State of North Dakota, have invented certain new and useful Improvements in Aeroplanes, of which the following is a specification.

My invention relates to improvements in aeroplanes, and has particular reference to improvements in aero-structural balancing mechanism for such machines.

The object of my invention is to secure the automatic equilibrium of aeroplanes to which it is attached.

It consists of a plummet device in which the weight of the operator seated in the plummet supplies the motive power for operating a mechanism connected with the ordinary guiding planes of an aeroplane in such manner that the plummet moves the guiding planes when the aeroplane, in forward motion, is, by varying winds, or for any other cause, tilted from its desired position, so that the wind pressure on the guiding planes will return the aeroplane to its desired position.

It consists further of a supplemental mechanism under control of the operator for adjusting the connections between the plummet and the guiding planes so that the aeroplane shall be guided or held automatically at any desired tilt or angle.

The invention further resides in the novel features of construction and combination and arrangement of parts substantially as illustrated in the accompanying drawings and as hereinafter described in the following specification, but it will be understood that I may make numerous changes in the details of said construction within the scope of my claims without exceeding or departing from the spirit of the invention.

Figure 1 represents a side elevation of my machine with the various planes and ailerons set to direct the machine in straight forward slightly rising flight. Fig. 2 represents a similar view illustrating the position assumed by the various parts when the machine accidentally dips. Fig. 3 represents a front elevation of the machine in normal direct flying position. Fig. 4 represents a similar view illustrating the position assumed by the parts when the machine is inadvertently tilted. Fig. 5 represents an enlarged detail front elevation of the adjusting mechanism. Fig. 6 represents a vertical sectional view on the line 6—6 of Fig. 5. Fig. 7 represents a sectional view at right angles to Fig. 6 on the line 7—7 of said figure. Fig. 8 represents an enlarged detailed transverse sectional view of the machine illustrating a modified construction for adjusting the planes for regulating the ascent and descent of the machine. Fig. 9 represents a fragmentary front elevation of the machine, showing the modification illustrated in Fig. 8. Fig. 10 represents an enlarged detail view of the means for locking the rack and pinion in adjusted position, and Fig. 11 represents a diagrammatic view of another modified plummet operated means for adjusting the front and rear guiding planes.

In the drawings, I have shown my improved mechanism as applied to a machine of the bi-plane type, having the lower plane 1 and the upper super-imposed plane 2 held in spaced relation by the braces and guys 3, the lower plane having secured thereto the suitable traction wheel 4.

Extending rearwardly from the bi-plane proper is the supplemental frame 5, while journaled at the rear of said frame is the spindle 6 on which is secured the rear guiding plane 7, a bracket 8 being secured to the plane and spindle and projecting upward therefrom and provided with a plurality of sockets 9. Secured to the front of the upper plane are the S-bars 10 in which are journaled the ends of the spindle 11 having secured thereon the front guiding plane 12 for regulating the ascent and descent of the machine, said plane and spindle likewise having secured thereto a bracket 13 having a plurality of sockets 14.

Depending on the upper plane at each side are a plurality of brackets 15 having bearings 16 in which are journaled the rock shafts 17 having at their inner ends 18 the cranks 19 on which are slidably mounted the bearing-blocks 20 having the bearing-passages 21 extending therethrough at right angles, the customary balancing planes 22 being secured on the ends of the shafts exterior to the main planes of the machine.

Depending from the upper plane is a bracket 23 to which is pivotally secured the supporting bar 24 having its upper portion squared and having secured to its lower end the seat 25 for the operator. Slidably mounted on the squared upper portion of said bar is the bracket 26 having pivoted to its front face the toothed segment 27 having its ends connected by a cross bar 28, while to secure the bracket 26 in vertically adjusted position on the bar I employ the locking pin 29 passing through an aperture 30 in the bracket and through a coinciding aperture in the cross bar and adapted to be engaged in one of a plurality of sockets 31 formed in the squared portion of the bar 24.

Projecting from the ends of the cross bar are the spindles 32 engaged in the bearings 21 of the slide bearing blocks 20 before described, and to limit the pivotal movement of the segment on the pin 29 I journal in the bracket 26 the shaft 33 bearing on one end the pinion 34 in mesh with the segmental rack while on the other end of the shaft I pivotally secure the wheel 35 adapted to turn the shaft to pivotally swing the segment. To secure the segment in pivotally adjusted position, I form in the wheel 35 the socket 69 in which is mounted the locking pin 70 projecting from the wheel and adapted to engage one of the sockets 71 in the circular locking plate 72, secured to the bar 24, a spring 73 mounted in the socket 69 serving to force the pin 70 into said socket. Pivoted to the other end of the pin and adapted to bear against the face of the wheel is the lever 74 having a cam head 75, the oscillation of the lever causing said head to engage the face of the wheel to draw the pin out of engagement with the socket, and thus permit of the rotation of the wheel and this pinion to adjust the position of the segments.

The operation of the machine will be readily understood by reference to Figs. 3 and 4 from which it will be seen that when the segment is secured with its cross bar at right angles to the supporting bar the planes are held in alinement with the main plane of the machine, while when the machine accidentally tilts the weight of the operator in the seat will swing the seat and said supporting bar 24 to maintain the same in vertical position, this movement of the bar swinging with it the cross bar with its pintles and elevating one of said pintles and depressing the other, said movement of the pintles being transmitted by the double slide bearings to the cranks of the rock shafts 17 to rock said shafts and thus throw the guiding planes 22 in opposite directions to catch the air and right the machine. It will be understood that when it is desired to tilt the aeroplane, the wheel 35 may be rotated to shift the segmentary rack and so move the balancing planes to tilt the machine, the planes remaining in such position with relation to the plummet and the weight of the operator serving to maintain the plummet in perpendicular position, and the aeroplane thus at the desired angle until the wheel 35 is again rotated. By adjusting the cross bar 28 with the attached spindle 32 to any desired angle right or left to bar 24, the aeroplane will under action of the balancing planes 22, assume the same angle and be kept at that angle by the free action of the plummet so long as desired, or until the angle of the spindle 32 to bar 24 is altered by the operator.

In Figs. 1 and 2 I have illustrated one of the forms of mechanism for shifting the front and rear elevation controlling planes of the machine, while in Fig. 8 I have illustrated a modified construction of the mechanism for controlling said planes. In both of said constructions I suspend from the upper plane 2 the brackets 37 having the bearings 38 at their lower ends while extending rearwardly through one of the bearings 38 is the rod 39 engaged in one of the sockets 9 of the bracket 8 of the rear plane, said bar having the collars 40 clampingly secured thereon on each side of the bracket to permit of slight play of the bracket on the rod. The other end of the rod has the depending arm 41 slidably engaged in the bearing 42 rotatably mounted on the rear end of the rack bar 43 slidably mounted on the guide 44 secured to one side of the bracket 26. Rotatably secured to the forward end of the rack bar 43 is a second bearing 45 in which is engaged the depending arm 46 of the rod 47 engaged in the bearing 38 at the front of the upper plane, said rod extending forward and being engaged in one of the sockets 14 of the bracket 13 depending from the front guiding plane, collars 48 being secured to the rod on each side of said bracket to permit of slight play of the bracket on the rod. To secure the rack bar in longitudinally-adjusted position with reference to the bar 24 and parts forming the plummet device, I journal in the bracket the shaft 49 having on one end the pinion 50 in mesh with the rack and having on the forward end, the wheel 51 for turning the shaft and pinion to longitudinally shift the rack bar in the bracket. The wheel 51 has mounted thereon, a locking device similar in all respects to the locking device illustrated on the wheel 35 in Fig. 10 for securing the wheel and thus the rack bar in longitudinally adjusted position.

From the foregoing description taken in connection with Figs. 1 and 2 the operation of my improved mechanism for automatically regulating the position of the elevation controlling planes will be readily understood, and it will be seen that upon the dipping of the machine the seat of the operator will swing forward carrying with it the bar 24 and thus the rack bar 43 adjustably secured thereto. Upon said movement of the bar 24 the rod 39 will be drawn forward bringing with it the end of the bracket 8 and depressing the forward end of the rear guiding plane, while at the same time the rod 47 will be pushed forward to move the bracket 13 and swing the forward end of the front guiding plane upward, counteracting the dipping tendency of the machine. When the machine has returned to its initial position the bar 24 will have swung back to move the front and rear guiding planes into their initial position as shown in Fig. 1. The machine may be made to rise or descend on incline by swinging the bar 43 forward or back.

In the modified construction shown in Fig. 8 I pivotally secure to the bar 24 the cross bars 53 from which depends the segmental toothed rack 54 in mesh with the pinion 55 secured on the end of the shaft 56 journaled in the bar 24 and having on its other end the handle 57 for turning the shaft and thus the pinion to shift the rack, the bar being provided with suitable locking means 58 for engaging the handle to secure it and through the pinion the rack in adjusted position. Secured to the ends of the cross bar 53 at right angles thereto are the rods 59 on which are slidably mounted the bearings 60 formed on the lower ends of the link 61 which are secured to one arm of the bell crank levers 62 pivotally supported from the upper plane by the hanger 63. Secured to the end of the other arm of one of the bell cranks 62 is a link 64 having its other end secured to the bracket 13 while secured to the free arm of the other bell crank is the link 65 extending to the bracket 8 of the rear plane. In the operation of this construction on the lateral swinging of the bar 24 the bearings at the lower ends of the links slide on the rods 59 and the bell cranks are unmoved thereby while on the forward or rearward swinging of the bar 24 the links will pull on the bell cranks and serve through them to shift links 24 and 25 and thus the planes at the front and rear of the machine, as heretofore described in connection with the preferred form of my invention.

In Fig. 11 I have diagrammatically illustrated another modified construction for adjusting the front and rear planes. Pivotally secured to the bar 24 is the cross bar 76 having depending therefrom the rack segments 77 as in the just described frame. In place, however, of employing the bell crank levers, I suspend from the upper plane the T rods having the vertically disposed arms 78 and the horizontal arms 79, said T rods being mounted on the pivots 80. Secured to the end of each arm 79 by a universal joint 81 is the member 82 having its other end connected by a second universal joint 83 to the adjacent end of the bar. In this form of the invention, the rear plane 7 has a pair of brackets 84, one projecting from each side of the plane, while secured to the end of each bracket is a wire 85 having its other end secured to the corresponding end of the vertical arm 78 of the T rod. The front plane 12 has a bracket 86 projecting from each side thereof, while secured to the upper end of the upper bracket and to the lower end of the arm 78 of the front T rod is the wire 87, a second wire 88 similarly crossing from the lower bracket to the upper end of said front T rod.

From the foregoing description, taken in connection with Fig. 11, the construction of this modification will be readily understood, and it will be seen that upon the forward or rearward swinging of the bar 24, the cross bar 76 will respectively elevate the link at one end thereof, and turn down the link at the other end, which movement will rock the T bars on their pivots to shift the planes as indicated in the dotted lines, while the swinging of the bar 24 in the opposite direction will likewise move the planes in the opposite direction. It will be understood, that the universal joints 81 and 83 will permit the bar 24 and cross bar 76 to oscillate from side to side of the machine without disturbing the position of the T rods, while moving the same upon the forward and rearward swinging of said bar 24.

It is evident from the above description taken in connection with the drawings that I have provided thoroughly efficient and practical mechanism for counteracting dipping or tipping movements of the aeroplane which is automatic in operation and in which the dipping regulating and tilting regulating mechanisms are capable of either independent or joint operation and which will consequently serve to right the machine irrespective of the direction of accidental movement thereof. It will be understood that any desired propelling mechanism 67 may be employed, driven by suitable motive power 68 and that the levers for controlling both said propelling mechanism and the manual operation of the various guiding planes are all supported by and moved with the bar 24 to be at all times within the grasp of the operator of the machine.

I claim:

1. In an aeroplane, the combination with the main supporting planes, of ailerons secured at the sides of the upper supporting plane, a plumb device depending from said upper plane and normally perpendicular thereto, a segmental rack pivotally secured to the plumb device, pintles projecting from the rack at right angles to the plumb device, connections between said pintles and the ailerons for shifting the latter, and means engaging the rack for locking the same to the plumb device in pivotally adjusted position, the movement of the plumb device from perpendicular relation to the upper plane automatically adjusting the ailerons.

2. In an aeroplane, the combination with a supporting plane, of brackets depending therefrom, rock shafts journaled in said brackets, ailerons secured on the outer ends of the shafts, said shafts having cranks formed on their inner ends, a bar depending from and pivotally secured to the supporting plane, an operator's seat secured on said bar, slide bearings having passages formed therein at right angles to, but out of alinement with each other, and pintles projecting from the bar and engaged in one of the passages in each slide bearing, the crank of one of the rock shafts being engaged in the other passage, and the swinging of the bar serving through the pintles and cranks to rock the shafts to adjust the ailerons.

3. In an aeroplane, the combination with a supporting plane, of brackets depending therefrom, rock shafts journaled in said brackets, ailerons secured on the outer ends of the shafts, said shafts having cranks formed on their inner ends, a bar depending from and pivotally secured to the supporting plane, an operator's seat secured on said bar, a cross bar pivotally secured to the depending bar, arms extending from said cross bar and slidably secured to the cranks of the rock shafts, means for manually rocking the cross bar on its pivot to shift the ailerons, and means for locking the cross bar immovably to the depending bar to cause the same to move with the depending bar as said bar swings on its pivot to automatically adjust the ailerons.

4. In an aeroplane, the combination with a supporting plane, of ailerons at the sides thereof, front and rear guiding planes therefor, a pivotally mounted bar depending from the supporting plane and bearing an operator's seat, rack members movably secured to said bar, means for locking said rack members to move with said bar, connections between one of said rack members and the front and rear guiding planes, connections between the other rack member and the ailerons, and means engaging said racks for moving the same to, through the connections, shift the guiding planes and ailerons.

5. In an aeroplane, the combination with a supporting plane, of ailerons at the sides thereof, front and rear guiding planes therefor, a bar depending from and pivotally secured to the supporting plane an operator seat secured to said bar, a bracket adjustably mounted on the bar, rack members supported by the bracket, connections between one of said rack members and the front and rear guiding planes, connections between the other rack member and the ailerons, means for engaging the racks of said members to shift the members and thus their respective planes, and means for immovably locking the rack members to the bar to cause them to move with the bar when it swings on its pivot to automatically adjust the various guiding planes.

In testimony whereof I affix my signature, in the presence of two witnesses.

ROBERT PATON.

Witnesses:
M. LOUISE LOWE,
B. JOHANSEN.